United States Patent
Kanazawa et al.

(10) Patent No.: US 9,929,773 B2
(45) Date of Patent: Mar. 27, 2018

(54) COMMUNICATION SYSTEM

(71) Applicant: Yazaki Corporation, Tokyo (JP)

(72) Inventors: Akiyoshi Kanazawa, Susono (JP);
Atsushi Takahashi, Susono (JP);
Kazuo Sugimura, Susono (JP);
Takaaki Izawa, Susono (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 8 days.

(21) Appl. No.: 15/468,738

(22) Filed: Mar. 24, 2017

(65) Prior Publication Data
US 2017/0201294 A1 Jul. 13, 2017

Related U.S. Application Data

(63) Continuation of application No. PCT/JP2015/080381, filed on Oct. 28, 2015.

(30) Foreign Application Priority Data

Oct. 29, 2014 (JP) ................................ 2014-220078
Oct. 26, 2015 (JP) ................................ 2015-209898

(51) Int. Cl.
*H04L 23/00* (2006.01)
*H04B 1/16* (2006.01)
(Continued)

(52) U.S. Cl.
CPC ................. *H04B 3/54* (2013.01); *H04B 3/32* (2013.01); *H04B 2203/5425* (2013.01)

(58) Field of Classification Search
CPC .......... H04B 3/54; H04B 3/32; H04B 7/0413; H04B 10/0799; H04B 11/00; H04B 13/02
(Continued)

(56) References Cited

U.S. PATENT DOCUMENTS 4,583,091 A * 4/1986 Sugiura ............... H02J 13/0058
307/138
5,587,733 A * 12/1996 Ono ........................ B41J 2/325
347/185
(Continued)

FOREIGN PATENT DOCUMENTS

JP   55-68854 U    5/1980
JP   2003-134008 A    5/2003
(Continued)

OTHER PUBLICATIONS

International Search Report for PCT/JP2015/080381 dated Dec. 8, 2015 [PCT/ISA/210].

*Primary Examiner* — Sam K Ahn
*Assistant Examiner* — Sarah Hassan
(74) *Attorney, Agent, or Firm* — Sughrue Mion, PLLC

(57) ABSTRACT

A slave control device receives a communication signal from a master control device, and controls loads according to the received communication signal. A modulator superimposes the communication signal from the master control device on power source lines, and a demodulator demodulates the communication signal superimposed on the power source lines and supplies the demodulated communication signal to the slave control device. The modulator is provided on power source lines on a battery side, and the demodulator is provided on the power source lines on a load side. The modulator superimposes the communication signal on the power source lines which are on a side closer to the loads with respect to the modulator among the power source lines.

8 Claims, 9 Drawing Sheets

(51) Int. Cl.
    *H04B 3/54*      (2006.01)
    *H04B 3/32*      (2006.01)

(58) Field of Classification Search
    USPC .......................................... 375/576; 455/205
    See application file for complete search history.

(56) References Cited

U.S. PATENT DOCUMENTS

| | | | |
|---|---|---|---|
| 6,268,879 B1 * | 7/2001 | Sato ..................... | H04M 1/675 |
| | | | 348/14.01 |
| 6,603,807 B1 * | 8/2003 | Yukutake ............ | H04L 25/0266 |
| | | | 257/532 |
| 7,623,896 B2 * | 11/2009 | Tanaka ................. | H03G 1/0088 |
| | | | 330/297 |
| 2003/0076221 A1 * | 4/2003 | Akiyama .......... | H04L 12/40182 |
| | | | 340/12.32 |
| 2005/0080235 A1 * | 4/2005 | Sanicola-Nadel ..... | C07K 14/47 |
| | | | 530/350 |
| 2007/0070319 A1 * | 3/2007 | Nakamura .......... | G03F 7/70025 |
| | | | 355/55 |
| 2007/0285246 A1 * | 12/2007 | Koyama ................. | G06F 1/263 |
| | | | 340/572.1 |
| 2010/0035614 A1 * | 2/2010 | Yokota ................. | H04W 36/36 |
| | | | 455/436 |
| 2013/0177087 A1 | 7/2013 | Langenberg et al. | |

FOREIGN PATENT DOCUMENTS

| | | |
|---|---|---|
| JP | 2005-44039 A | 2/2005 |
| JP | 2005-223609 A | 8/2005 |
| JP | 2007-158848 A | 6/2007 |
| JP | 2008-182491 A | 8/2008 |

* cited by examiner

COMMUNICATION SYSTEM

TECHNICAL FIELD

The present invention relates to a communication system, and particularly relates to a communication system for performing communication by a PLC (Power Line Communication) method.

BACKGROUND ART

Conventionally, the communication system of the PLC method for performing communication via a power source line has been known. As an example of installing this communication system of the PLC method in a vehicle, a communication system shown in FIG. 11 has been known. As shown in this figure, the conventional communication system 100 includes: a CPU 102 that sends a communication signal according to operation of an operation unit 101; a PLC modulator 103 that superimposes the communication signal from the CPU 102 on a power source line L; a PLC demodulator 104 which demodulates the communication signal that is superimposed on the power source line L; and a CPU 106 which controls a load 105 according to the communication signal that is demodulated by the PLC demodulator 104.

In the conventional communication system 100, the PLC modulator 103 and the PLC demodulator 104 are connected to each other in parallel. Thus, since the PLC modulator 103 superimposes the communication signal on the power source line L on a side closer to a battery 107, which is shown by a bold line in the figure, the communication signal is superimposed not only on the power source line L between the PLC modulator 103 and the PLC demodulator 104, but also on the power source line L that is to be connected to another load 108. Since the power source line L is provided to have significantly low impedance, the communication signal may be attenuated, in the case where the other load 108 connected to the power source line L is a capacitive load.

Then, it would be considered to be effective to separate the other load 108 from the power source line L while performing the PLC communication, but there are problems of limiting a timing for performing the communication and the like.

SUMMARY OF INVENTION

Technical Problem

Accordingly, the present invention aims to provide a communication system which can suppress attenuation of a communication signal that is to be superimposed on a power source line.

Solution to Problem

A first aspect for solving the object is a communication system including: a transmission unit; a reception unit that receives a communication signal from the transmission unit; power source lines that connect one of electrodes of a battery and the loads; a modulation unit that superimposes the communication signal from the transmission unit on the power source line; and a demodulation unit that demodulates the communication signal that is superimposed on the power source line and supplies the communication signal to the reception unit, wherein the modulation unit is provided on the power source line on a side closer to the battery, the demodulation unit is provided on the power source line on a side closer to the loads, and the modulation unit superimposes the communication signal on the power source line on the side closer to the loads with respect to the modulation unit.

A second aspect is the communication system according to the first aspect, wherein the modulation unit includes a semiconductor transistor having a control terminal to which the communication signal from the transmission unit is input.

A third aspect is the communication system according to the second aspect, further including a switching semiconductor transistor that is provided between the battery and another battery, and switches on and off a connection between the battery and the other battery, wherein the switching semiconductor transistor is used as the semiconductor transistor that constitutes the modulation unit.

A fourth aspect is the communication system according to the second or third aspect, wherein a pulse communication signal that gradually rises and gradually falls is input into the control terminal of the semiconductor transistor.

A fifth aspect is the communication system according to any one of the first to fourth aspects, wherein the demodulation unit includes: a high pass filter that differentiates a power source on the power source line on which the communication signal is superimposed; and a comparing unit that compares the differentiated voltage with a reference voltage and outputs a comparison result as the demodulated communication signal.

A sixth aspect is the communication system according to any one of the first to fifth aspects, further including a communication line for transmitting the communication signal from the transmission unit to the reception unit, wherein the reception unit is provided so as to be able to receive both of the communication signal from the communication line and the communication signal from the power source line that is demodulated by the demodulation unit.

Advantageous Effects of Invention

As described above, according to the first form, since the communication signal is superimposed on the power source line on the side closer to the load with respect to the modulation unit, the other capacitive load can be separated from the power source line on which the communication signal is to be superimposed, thereby suppressing the attenuation of the communication signal that is to be superimposed on the power source line.

According to the second form, the modulation unit can be provided in a simple configuration.

According to the third form, a switching semiconductor transistor which turns on and off the connection between the two batteries is used as the semiconductor transistor of the modulation unit, and these transistors are not necessary to be provided separately, whereby it is possible to reduce the cost.

According to the fourth form, since the pulse communication signal that gradually rises and gradually falls is input into the control terminal of the semiconductor transistor, conductive noises can be reduced.

According to the fifth form, since the differentiated voltage is compared with the reference voltage, the communication signal is hardly affected by a power source voltage, noises and the like so as to be demodulated precisely.

According to the sixth form, by using the power source line as a backup of the communication line, the backup can be provided without increasing the number of members.

DESCRIPTION OF EMBODIMENTS

First Embodiment

Figure 1:
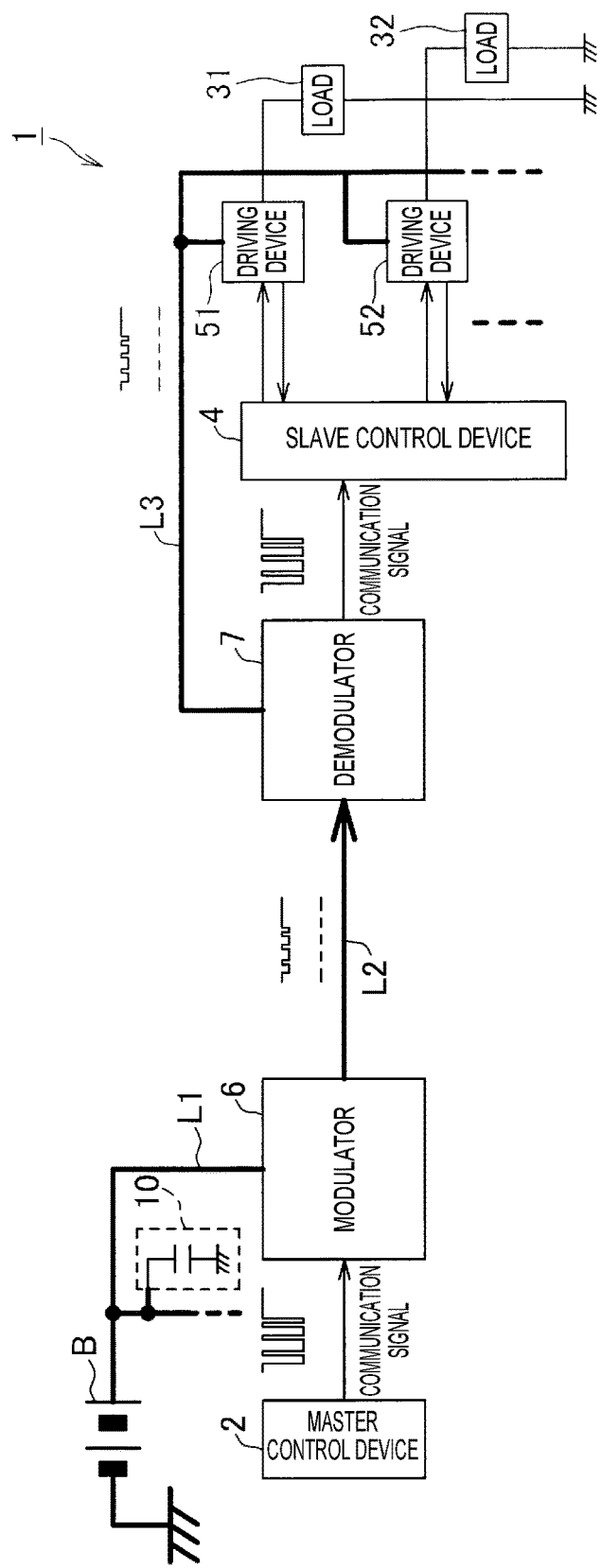
FIG. 1 is a circuit diagram that illustrates an example of a communication system of the present invention.

Hereinafter, a communication system of the present invention in a first embodiment will be described with reference to FIGS. 1 and 2. The communication system 1 shown in the figures is installed in a vehicle. As shown in the figures, the communication system 1 includes: a master control device 2 as a master control unit and a transmission unit; a slave control device 4 as a slave control unit and a reception unit, which receives a communication signal from the master control device 2 and controls loads 31 and 32 according to the received communication signal; power source lines L1 to L3 which connect a cathode of a battery B and the load 31 and 32; driving devices 51 and 52 that drive the loads 31 and 32; a modulator 6 that superimposes the communication signal from the master control device 2 on the power source lines L2 and L3; and a demodulator 7 which demodulates the communication signal that is superimposed on the power source line L2 and supplies the demodulated communication signal to the slave control device 4.

The master control device 2 and the slave control device 4 include microcomputers, each of which includes a known CPU, ROM and RAM. The power source line L1 is a line that connects a cathode of a battery B and the modulator 6. The power source line L2 is a line that connects the modulator 6 and the demodulator 7. One end of the power source line L3 is connected to the demodulator 7, and other end thereof is branched into plural lines which are connected to the plural driving devices 51 and 52, respectively. The driving devices 51 and 52 are controlled by the slave control device 4, and transform a power source voltage supplied from the power source line L3 into a drive voltage so as to supply the drive voltage to the loads 31 and 32, respectively.

The modulator 6 is provided on the power source lines L1 to L3 on a side closer to the battery B, and the demodulator 7 is provided on the power source lines L1 to L3 on a side closer to the loads 31 and 32, where the modulator 6 and the demodulator 7 are connected to each other in series.

Figure 2:
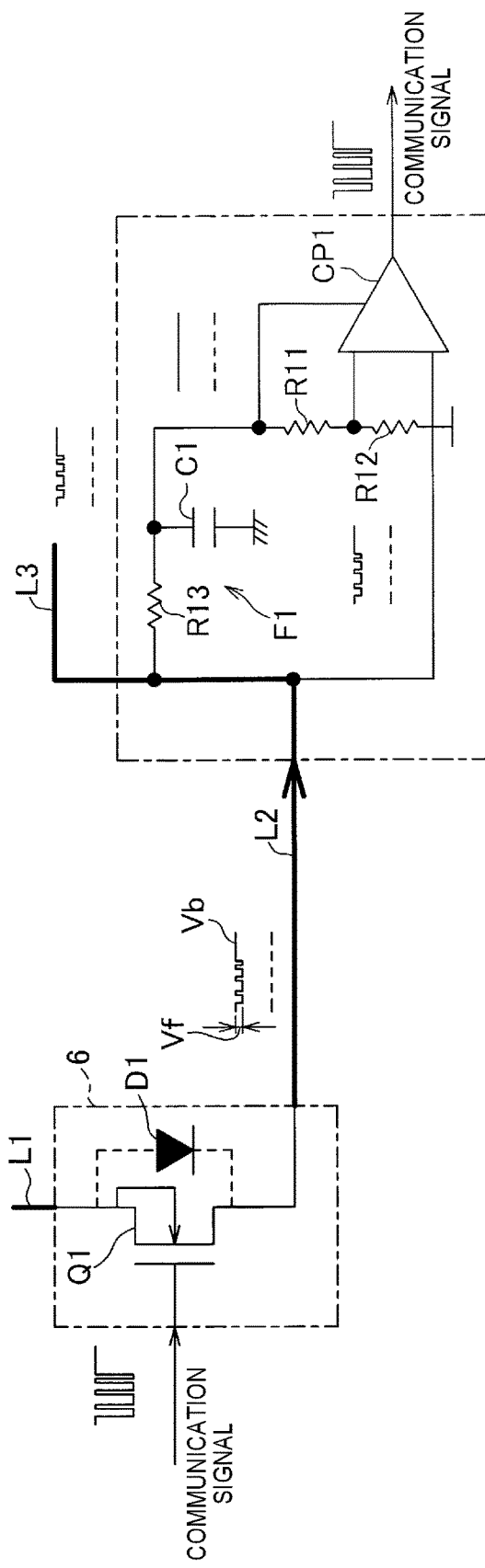
FIG. 2 is a circuit diagram illustrating details of a modulator and a demodulator that compose the communication system shown in FIG. 1 in a first embodiment.

As shown in FIG. 2, the modulator 6 includes an n-channel FET Q1 (semiconductor transistor). A source of this FET Q1 is connected to the power source line L1, and a drain of the FET Q1 is connected to the power source line L2. That is, the FET Q1 is provided so that a forward direction of a parasitic diode D1 of the FET Q1 may be directed to the loads 31 and 32. Further, a pulse communication signal of, for example, about 10 kHz is input into a gate (control terminal) of the FET Q1 from the master control device 2.

According to the above-described configuration, while the communication signal is on a H-level, the FET Q1 is on, whereby a power source voltage Vb which is potential of the cathode of the battery B is output to the power source line L2. Whereas, while the communication signal is on an L-level, the FET Q1 is off, whereby a voltage which is reduced from the power source voltage Vb by a voltage drop Vf caused by a parasitic diode D1 of the FET Q1 is output to the power source line L2. Thereby, the modulator 6 superimposes the communication signal on the power source voltage Vb that is supplied from the power source lines L2 and L3 on the side closer to the loads 31 and 32. The communication signal is not superimposed on the power source line L1, which is on the side closer to the battery B.

As shown in FIG. 2, the demodulator 7 is composed of: a low pass filter F1; partial resistances R11 and R12; and a comparator CP1. The low pass filter F1 is composed of: a resistance R13; and a capacitor C1, and removes a communication signal having a frequency that is higher than a cutoff frequency from the voltage supplied from the power source line L2, thereby outputting only the power source voltage Vb. The partial resistances R11 and R12 divide the power source voltage Vb that is output from the low pass filter F1, and input the divided power source voltage Vb as a reference voltage into the comparator CP1.

The partial resistances R11 and R12 are respectively set so that the reference voltage to be supplied to the comparator CP1 may be lower than the power source voltage Vb and higher than the voltage that is reduced from the power source voltage Vb by the voltage drop Vf. The power source voltage Vb, on which the communication signal supplied from the power source line L2 is superimposed, is further input into the comparator CP1, and the comparator CP1 compares this voltage with the above-described reference voltage, and outputs the comparison result as a communication signal so as to supply the communication signal to the slave control device 4.

According to the communication system 1 having the above-described configuration, when the master control device 2 transmits the communication signal, the modulator 6 superimposes this communication signal on the power source lines L2 and L3 on the side closer to the loads 31 and 32. The demodulator 7 demodulates the communication signal that is superimposed on the power source lines L2 and L3, and outputs the demodulated communication signal to the slave control device 4. The slave control device 4 drives the driving devices 51 and 52 according to the communication signal that is demodulated by the demodulator 7 so as to drive the loads 31 and 32.

According to the embodiment described above, the modulator 6 is provided on the power source lines L1 to L3 on the side closer to the battery B, and the demodulator 7 is provided on the power source lines L1 to L3 on the side closer to the loads 31 and 32, where the modulator 6 superimposes the communication signal on the power source lines L2 and L3, which are on the side closer to the loads 31 and 32 with respect to the modulator 6 among the power source lines L1 to L3. Thus, the communication signal is not superimposed on the power source line L1, which is on the side closer to the battery B, unlike that in the conventional communication system. Thus, another capacitive load 10 that is to be connected to the power source line L1 can be separated from the power source lines L2 and L3 on which the communication signal is superimposed, whereby the attenuation of the communication signal that is to be superimposed on the power source lines L2 and L3 can be suppressed.

Further, according to the embodiment described above, the modulator 6 is provided on the power source lines L1 to L3, and includes the FET Q1 having a gate to which the communication signal from the master control device 2 is input. Thereby, the modulator 6 can be provided in a simple configuration.

Incidentally, according to the embodiment described above, the FET Q1 is used as a semiconductor transistor, but the semiconductor transistor is not limited to this. For example, instead of the FET Q1, a bipolar transistor may be used. The bipolar transistor does not have the parasitic diode D1, and thus functions similarly to the FET Q1, if a diode is connect between an emitter and a connector.

Second Embodiment

Figure 3:
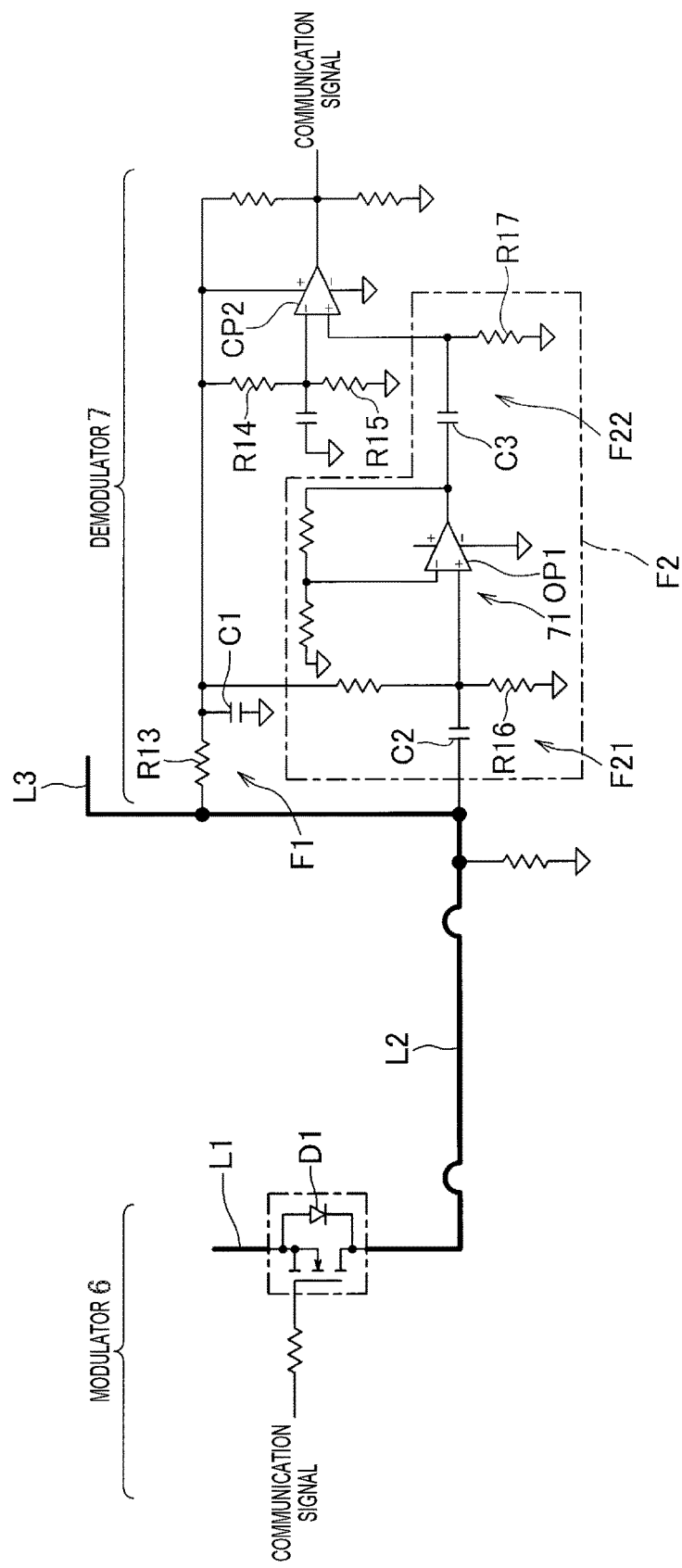
FIG. 3 is a circuit diagram illustrating details of a modulator and a demodulator that compose the communication system shown in FIG. 1 in a second embodiment.

Next, the communication system of the present invention in a second embodiment will be described below with reference to FIGS. 3 to 5. Incidentally, elements in FIG. 3, which are equivalent to those in FIG. 2 and have been already explained in the above-described first embodiment, will be denoted by the same reference codes, and their detailed explanation will be omitted. The second embodiment is distinctive from the first embodiment in a configuration of the demodulator 7. Since the elements other than the demodulator 7 are equivalent to those of the above-described first embodiment, their detailed explanation will be omitted.

The demodulator 7 is composed of: a high pass filter F2; a low pass filter F1; partial resistances R14 and R15; and a comparator CP2 as a comparing unit. The high pass filter F2 is composed of: a primary filter F21 and a secondary filter F22 that differentiate a voltage on the power source line L2 on which a communication signal is superimposed; and an amplifier circuit 71 that is provided between the primary filter F21 and the secondary filter F22.

The primary filter F21 is composed of: a resistance R16; and a capacitor C2, and removes a component having a frequency that is lower than a cutoff frequency (for example, 5 kHz) from the voltage on the power source line L2. The amplifier circuit 71 has an OP amplifier OP1 so as to amplify an output from the primary filter F21, and inputs the amplified output into the secondary filter F22. The secondary filter F22 is composed of: a resistance R17; and a capacitor C3, removes a component having a frequency that is lower than a cutoff frequency (for example, 10 kHz) from the output from the amplifier circuit 71, and supplies the removed output to the comparator CP2.

Figure 4:
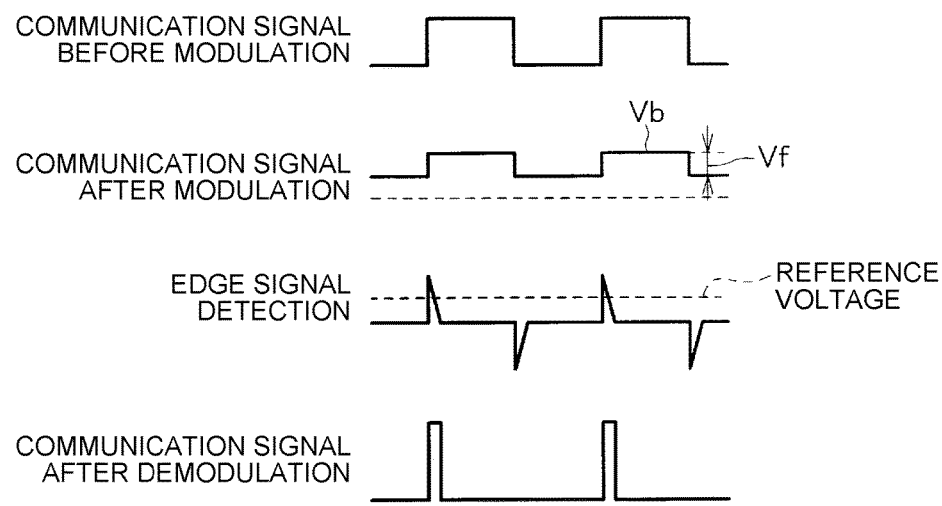
FIG. 4 is a time chart of source output of an FET shown in FIG. 3, output of differentiating circuit and output of a comparator.
Figure 5:
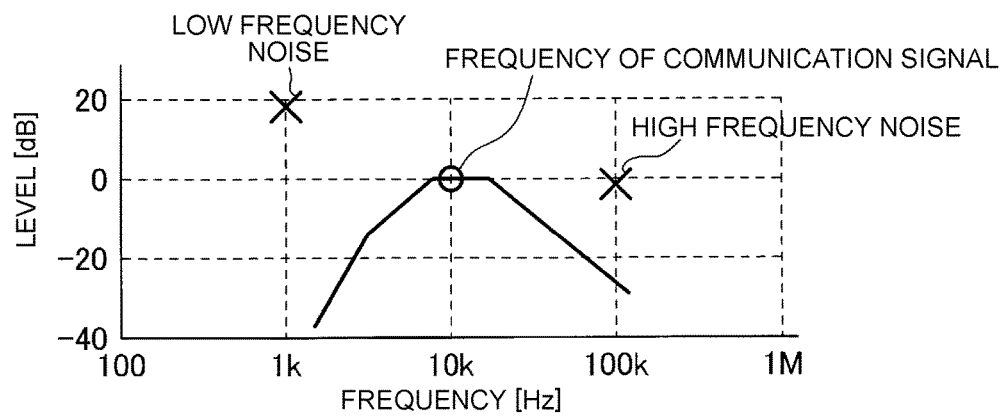
FIG. 5 is a graph that illustrates a frequency characteristic of a demodulator shown in FIG. 4.

That is, as shown in FIG. 4, the high pass filter F2 outputs a power source voltage on which the communication signal is superimposed, that is, an edge detection signal obtained by differentiating the communication signal after the modulation, which is then input into the comparator CP2. As the edge detection signal, a triangle wave is output in a negative direction when the communication signal after the modulation falls from the power source voltage Vb by the voltage drop Vf, and a triangle wave is output in a positive direction when the communication signal after the modulation rises from the state of falling by the voltage drop Vf to the power source voltage Vb.

Since the low pass filter F1 is similar to that of the first embodiment, detailed explanation thereof will be omitted here. The partial resistances R14 and R15 divide the power source voltage Vb that is output from the low pass filter F1, and input the divided voltage as a reference voltage into the comparator CP2.

As shown in FIG. 4, the partial resistances R14 and R15 are respectively set so that the reference voltage to be supplied to the comparator CP2 may be lower than a maximum value of the edge detection signal. The comparator CP2 compares the edge detection signal with the reference voltage, outputs the comparison result as a demodulated communication signal, and supplies the comparison result to the slave control device 4. Thereby, the demodulated communication signal has a waveform in which one pulse is output every time when the communication signal before the demodulation rises, and nothing is input when the communication signal before the demodulation falls.

In the first embodiment, the communication signal itself after the modulation was compared with the reference voltage. However, it can be estimated that a power source voltage of an actual vehicle is not stable due to the influences of: fluctuation of voltage levels while driving the loads; the superimpose of a noise on the power source line L2; and the like. Thus, in the method of the first embodiment, the demodulation of the communication signal is difficult.

According to the above-described second embodiment, since the communication signal after the modulation is differentiated so as to output the edge detection signal, and the edge detection signal is compared with the reference voltage, the communication signal is hardly affected by the power source voltage, the noises and the like, whereby the communication signal that is superimposed precisely on the power source line L2 can be demodulated.

In addition, the OP amplifier OP1 is used as the high pass filter F2. Since the OP amplifier OP1 cannot pass through a wide area, a low pass filter is also formed naturally. Thus, as shown in FIG. 5, not only low frequency noises but also high frequency noises can be removed by the primary filter F21 and the secondary filter F22. Thereby, the communication signal that is superimposed more precisely on the power source line L2 can be demodulated. Further, only by adding the high pass filter F2, an equivalent effect of also adding the low pass filter can be obtained.

Incidentally, the number of the used OP amplifiers is two in the second embodiment, which is increased from the first embodiment that employed just one OP amplifier. However, an upper limit of the cost can be suppressed to be minimum by a contrivance, for example, using an OP amplifier that is a combination of two amplifiers.

Third Embodiment

Figure 6:
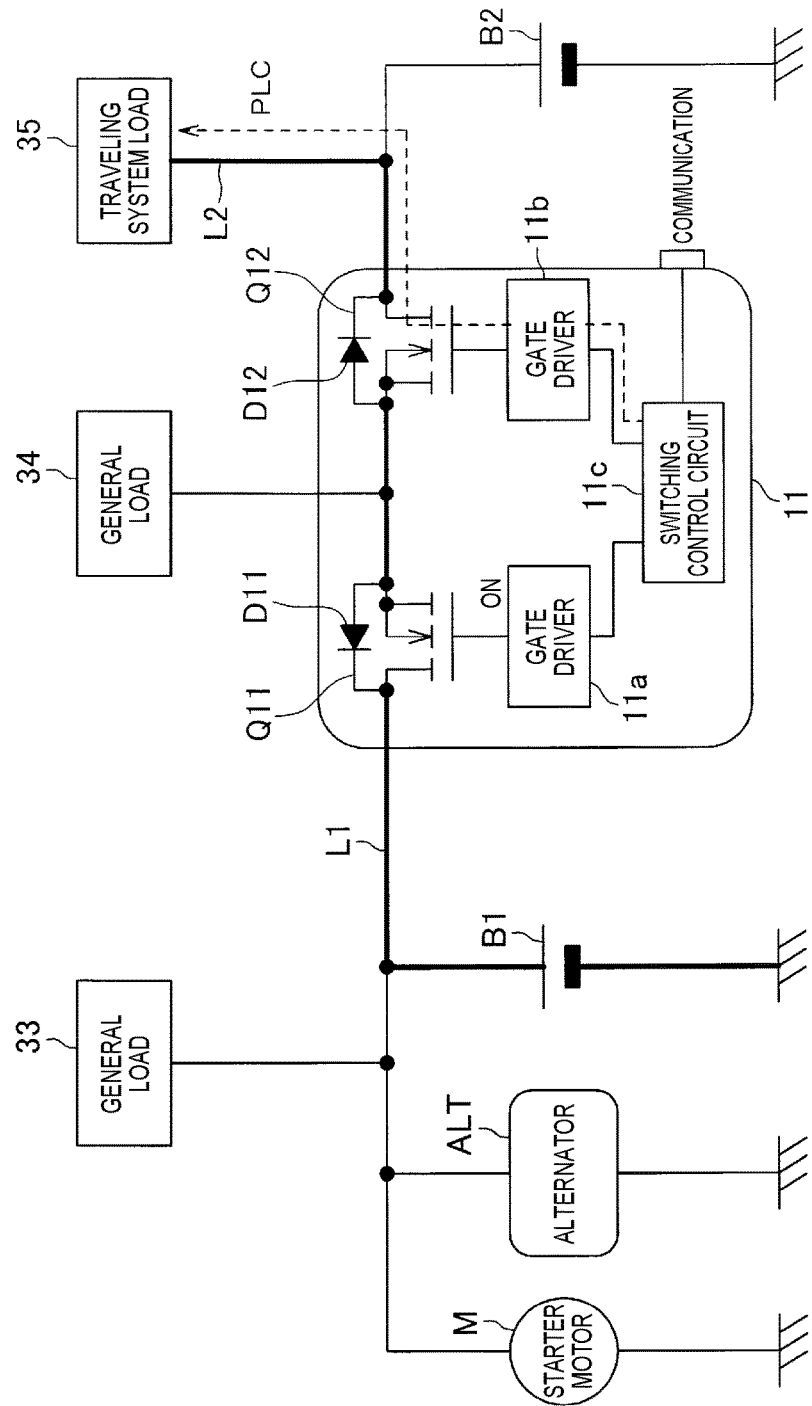
FIG. 6 is a circuit diagram that illustrates an example of a communication system in a third embodiment.

Next, the communication system of the present invention in a third embodiment will be described below with reference to FIG. 6. In FIG. 6, the demodulator 7, the slave control device 4 and the driving devices 51 and 52 are not illustrated. The communication system of the third embodiment is presupposed to be provided on a vehicle that is equipped with two batteries B1 and B2, as shown in FIG. 6. The batteries B1 and B2 have different rated voltages.

The battery B1 includes, for example, a lead battery for starting an engine. The battery B2 as another battery includes a lithium ion battery for voltage stabilization, and is connected to the battery B1 in parallel. To these batteries B1 and B2, a starter motor M, an alternator ALT, general loads 33 and 34 and a traveling system load 35 are connected in parallel.

As described above, on the vehicle equipped with these two batteries B1 and B2, a switching unit 11 for switching on and off the connection between the batteries B1 and B2 is generally provided. The switching unit 11 includes: two n-channel FETs Q11 and Q12 that are provided between the batteries B1 and B2; gate drivers 11a and 11b that drive these FETs Q11 and Q12; and a switching control circuit 11c that controls the gate drivers 11a and 11b.

The FETs Q11 and Q12 are connected in series between the batteries B1 and B2. The FETs Q11 and Q12 are connected in series so that parasitic diodes D11 and D12 may be directed oppositely to each other. Thereby, in either of: a case where a power source voltage of the battery B1 is higher than that of the battery B2; and a case where the power source voltage of the battery B2 is higher than that of the battery B1, when switching off the two FETs Q11 and Q12, no current flows through the parasitic diodes D11 and D12 so as to break the connection between the batteries B1 and B2 completely.

Incidentally, since the starter motor M, the alternator ALT and the general load 33 are connected to the communication system on a side closer to the battery B1 with respect to the FETs Q11 and Q12, when switching off the FETs Q11 and Q12, the connections of the starter motor M, the alternator ALT and the general load 33 with the battery B2 are broken. Whereas, since the general load 34 is connected to the communication system between the FETs Q11 and Q12, when switching off the FETs Q11 and Q12, the connections of the general load 34 with both of the batteries B1 and B2 are broken. Further, since the traveling system load 35 is connected to the communication system on a side closer to the battery B2 with respect to the FETs Q11 and Q12, when switching off the FETs Q11 and Q12, the connection of the traveling system load 35 with the battery B1 is broken.

The switching control circuit 11c is composed of, for example, a CPU or the like, and controls to switch on and off the FETs Q11 and Q12 according to a command of a superordinate unit so as to control the connection between the batteries B1 and B2.

In the third embodiment, this switching unit 11 is used as a modulator, and an FET Q12 is used as an FET that constitutes the modulator. That is, the switching control circuit 11c is connected to the master control device 2 that was explained in the first embodiment, and receives a communication signal from the master control device 2. The switching control circuit 11c allows the FET Q11 to be always on while performing PLC communication so as to switch on and off the FET Q12 according to the received communication signal.

Thereby, similarly to the first embodiment, the power source voltage Vb which is potential of the cathode of the battery B1 is output to the power source line L2, while the FET Q12 is on. On the other hand, while the FET Q12 is off, a voltage that is reduced from the power source voltage Vb by the voltage drop Vf caused by the parasitic diode D12 of the FET Q12 is output to the power source line L2. That is, the switching unit 11 superimposes the communication signal on the power source voltage Vb that is supplied from the power source line L2 on a side of the traveling system load 35, as shown by a dotted line. The communication signal is not superimposed on the power source line L1, which is on the side closer to the battery B1.

According to the above-described third embodiment, the switching FET Q12 for switching on and off the connection between the two batteries B1 and B2 is used as an FET of the modulator. Thereby, since these FETs are not necessary to be provided separately, the modulator can be provided with the minimum number of members to be added, thereby reducing the cost. Further, the switching unit 11 is provided with not only the switching function but also the communication function, whereby the added value can be enhanced.

Figure 7:
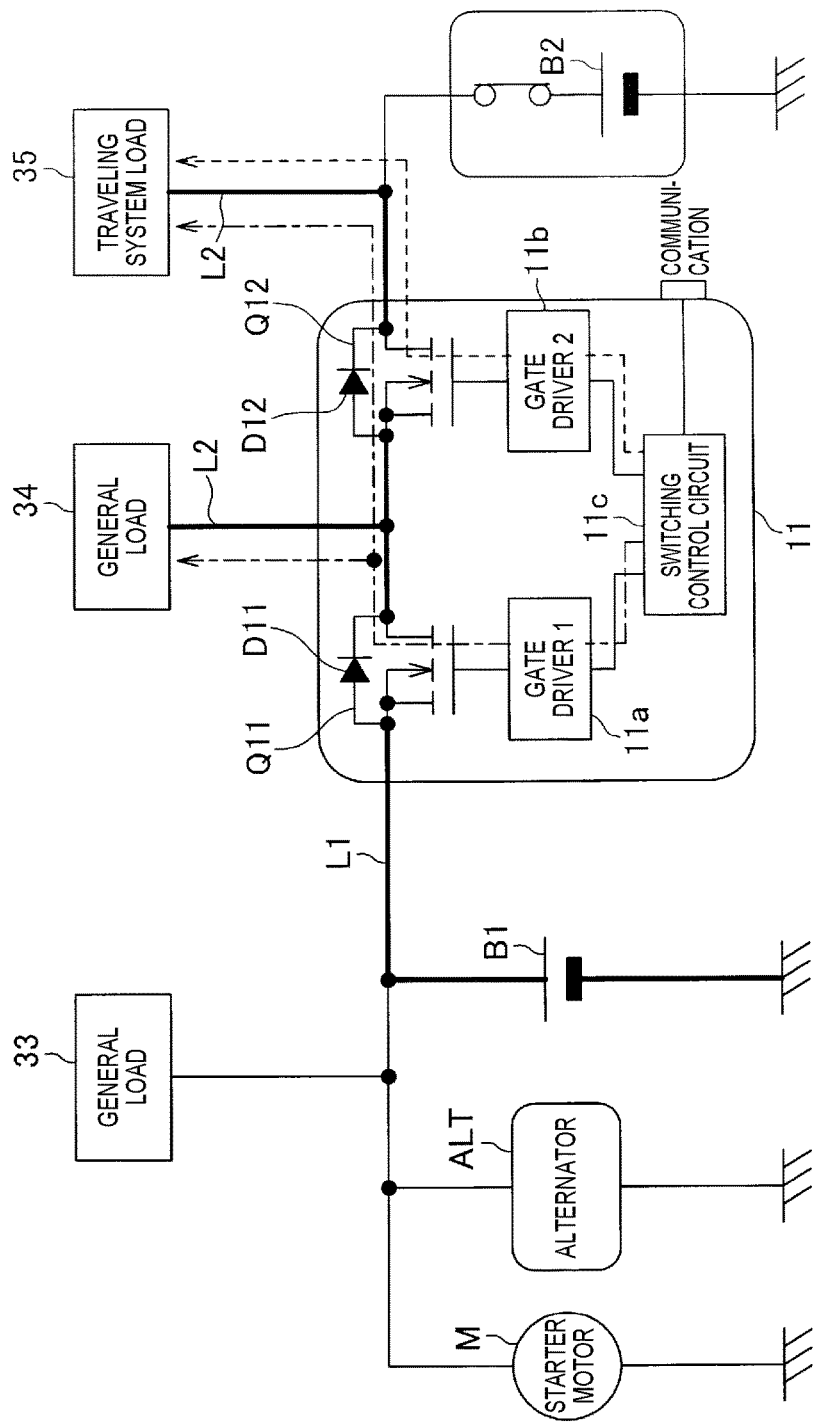
FIG. 7 is a circuit diagram that illustrates an example of a communication system in a modified example of the third embodiment.

Incidentally, according to the third embodiment described above, the FETs Q11 and Q12 are connected in series so that the parasitic diodes D11 and D12 may be directed oppositely to each other, but their connection is not limited to this. For example, as shown in FIG. 7, the two FETs Q11 and Q12 may also be connected in series so that the parasitic diodes D11 and D12 may be directed in the same direction. These two FETs Q11 and Q12 are provided for switching the batteries B1 and B2 that supply the power source to the general loads 33 and 34 and the traveling system load 35.

In the case shown in FIG. 7, both of the FETs Q11 and Q12 can be used as FETs that compose the modulator. In more detail, the switching control circuit 11c is connected to the master control device 2 that was described in the first embodiment so as to receive a communication signal from the master control device 2. The switching control circuit 11c allows the FET Q11 to be always on while performing the PLC communication, and switches on and off the FET Q12 according to the received communication signal. Since this operation is similar to the case of FIG. 6, detailed explanation thereof will be omitted.

Further, the switching control circuit 11c can also allow the FET Q12 to be always on, and can switch on and off the FET Q11 according to the received communication signal. Thereby, while the FET Q11 is on, the power source voltage Vb that is the potential of the cathode of the battery B1 is output to: the power source line L2 between the FET Q11 and the general load 34; and the power source line L2 between the FET Q12 and the traveling system load 35. Whereas, while the FET Q11 is off, a voltage that is reduced from the power source voltage Vb by the voltage drop Vf caused by the parasitic diode D11 of the FET Q11 is output to: the power source line L2 between the FET Q11 and the general load 34; and the power source line L2 between the FET Q12 and the traveling system load 35. That is, the switching unit 11 can superimpose the communication signal on the power source voltage Vb that is supplied to both of the general load 34 and the traveling system load 35 as shown by long dashed short dashed lines.

Fourth Embodiment

Figure 8:
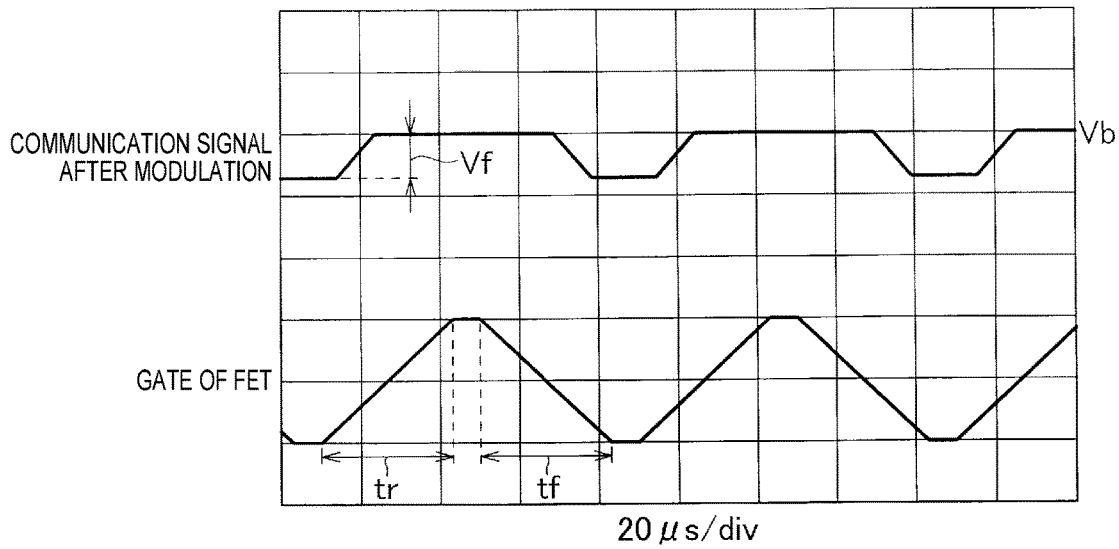
FIG. 8 is a time chart of gate input and source output of an FET in a fourth embodiment.
Figure 9:
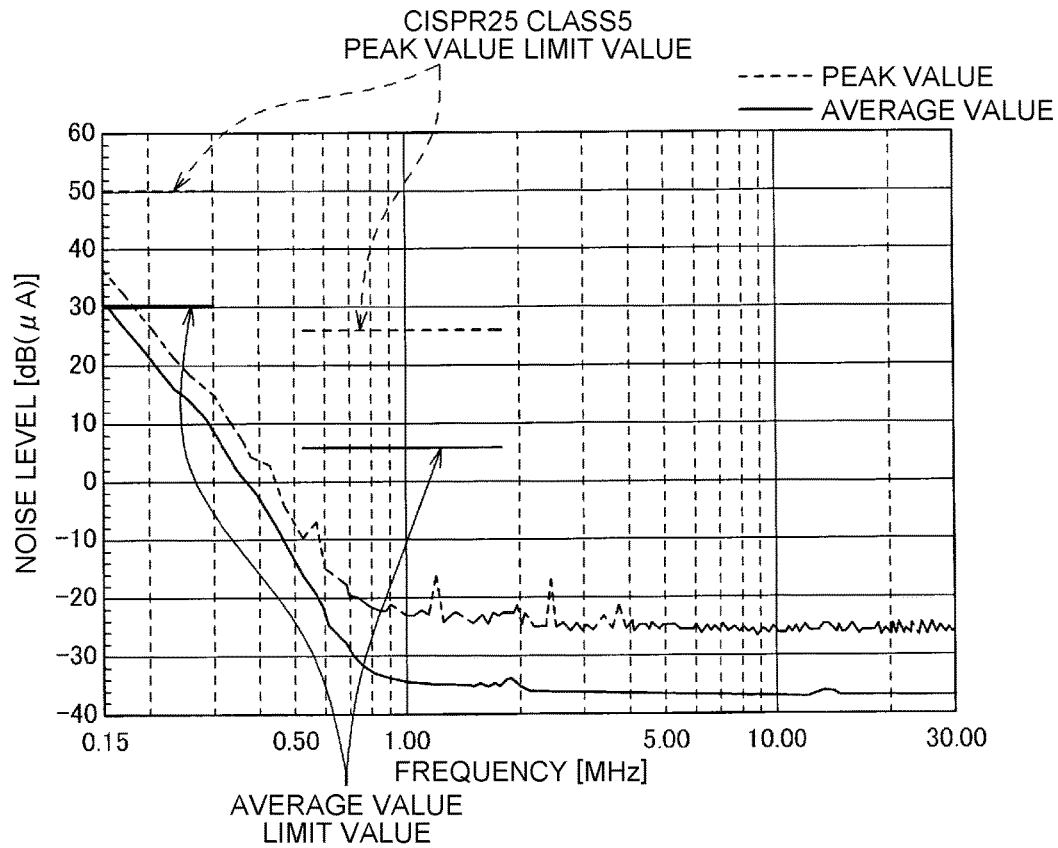
FIG. 9 is a graph illustrating a frequency characteristic of a conductive noise when a communication signal of tr=tf=32 μs is input into a gate of the FET.

Next, the communication system of the present invention in a fourth embodiment will be described below with reference to FIGS. 8 and 9. Since a configuration of the communication system of the fourth embodiment shown in FIG. 1 is equivalent to the communication system of the first embodiment, its detailed explanation will be omitted here. A point of the fourth embodiment that is markedly different from the first embodiment is a waveform of the communication signal supplied to the gate of the FET Q1.

The communication system 1 of the above-described first embodiment superimposes the communication signal by changing the level of the power source voltage Vb. Thus, the generation of a conductive noise was observed.

The generation of such a conductive noise is mainly caused by a steep voltage change at the time of switching on or off the FET Q1. Thus, in the present embodiment, a pulse communication signal that gradually rises and gradually falls is input into the gate of the FET Q1 as shown in FIG. 8. By inputting such a communication signal, the communication signal after the modulation can be changed gently from the power source voltage Vb to (the power source voltage Vb−the voltage drop Vf) and from (the power source voltage Vb−the voltage drop Vf) to the power source voltage Vb, whereby the conductive noises can be reduced.

Next, the inventors of the present invention have measured a noise level, while gradually increasing a rising time tr and a falling time tf of the communication signal that is to be input into the gate of the FET Q1. As a result, they have found that a power-line conducted emissions standard (CISPR25 Classy) can be satisfied when the rising time tr and the falling time tf are longer than 32 μs (tr=tf) as shown in FIG. 9. In FIG. 9, a dotted line represents a frequency characteristic of a peak value of the noise level, and a solid line represents an average value thereof, where the communication signal satisfies the relation of tr=tf=32 μs. Also from the figure, it can be realized that both of the peak value and the average value satisfy the standard when the rising time tr and the falling time tf are 32 μs (tr=tf=32 μs).

Fifth Embodiment

Figure 10:
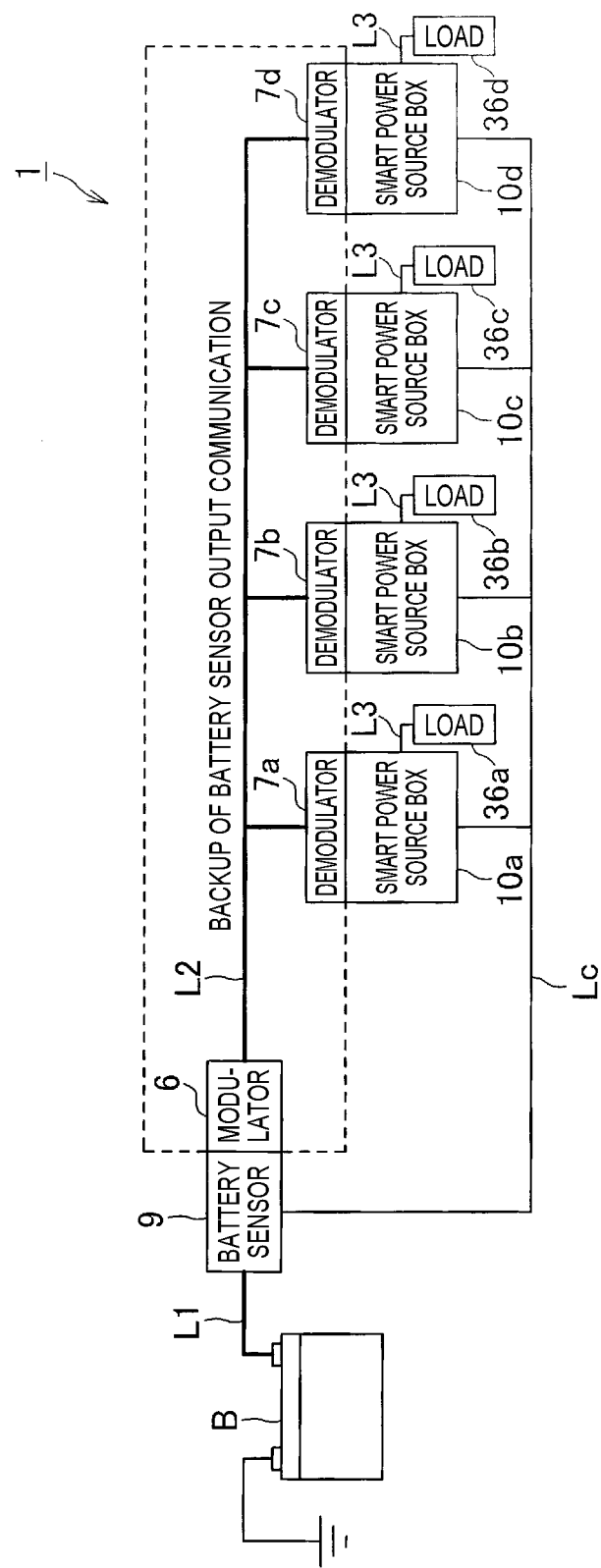
FIG. 10 is a circuit diagram that illustrates an example of a communication system in a fifth embodiment.
Figure 11:
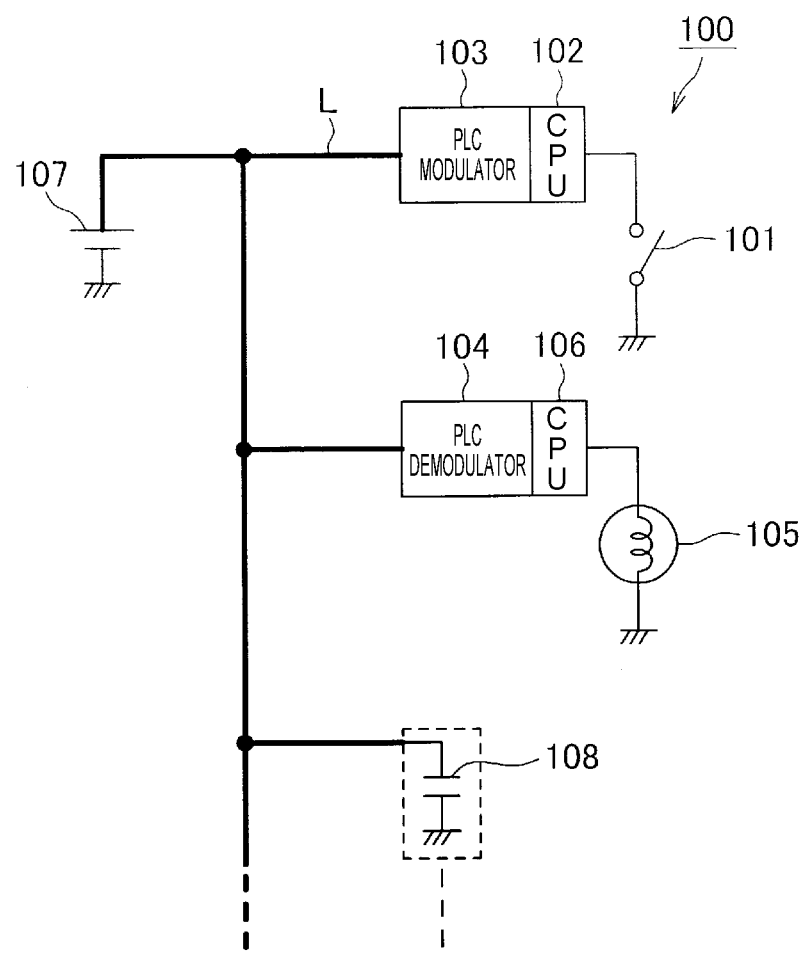
FIG. 11 is a circuit diagram that illustrates an example of a conventional communication system.

Next, the communication system of the present invention in a fifth embodiment will be described below with reference to FIG. 10. Incidentally, elements in FIG. 10 equivalent to those in FIG. 1, which have been already explained in the first embodiment, will be denoted by the same reference codes, and their detailed explanation will be omitted.

As shown in the figure, the communication system 1 includes: a battery sensor 9 as a transmission unit that detects a state of a battery B and outputs a detection signal; smart power source boxes 10a to 10d as reception units that receive the detection signal (communication signal) from the battery sensor 9 and control loads 36a to 36d according to the received detection signal; power source lines L1 to L3 that connect a cathode of the battery B and the loads 36a to 36d; a modulator 6 that superimposes the detection signal from the battery sensor 9 on the power source lines L2 and L3; demodulators 7a to 7d which demodulate the detection signal that is superimposed on the power source line L2 and supply the demodulated detection signal to the smart power source boxes 10a to 10d; and a communication line Lc for transmitting the detection signal from the battery sensor 9 to the smart power source boxes 10a to 10d.

The battery sensor 9 detects a state of the battery B such as a remaining capacity and both end voltages, and transmits its detection signal to the smart power source boxes 10a to 10d via the communication line Lc and the power source line L2. A communication method via the communication line Lc adopts a known LIN, CAN or the like. The communication via the power source line L2 is performed similarly to that in the first embodiment.

The smart power source boxes 10a to 10d include microcomputers, each of which includes a known CPU, ROM and RAM. The smart power source boxes 10a to 10d are provided to be able to receive both of the detection signal via the communication line Lc and the detection signal via the power source line L2.

The power source line L1 is a line that connects the cathode of the battery B and the modulator 6 similarly to that of the first embodiment. The power source line L2 is a line that connects the modulator 6 and the demodulators 7a to 7d. The power source lines L3 are lines that connect the demodulators 7a to 7d and the loads 36a to 36d, respectively.

The modulator 6 and the demodulators 7a to 7d are equivalent to the modulator 6 and the demodulator 7 of the first embodiment, and their detailed explanation will be omitted. The smart power source boxes 10a to 10d respectively control the loads 36a to 36d according to the detection signal from the battery sensor 9 by self-control (for example, in the case where the remaining capacity of the battery B is small, the smart power source boxes 10a to 10d cut off power source supply to a part of an audio system load, which is not related to the travelling).

As described above, in the fifth embodiment, the detection signal is transmitted from the battery sensor 9 to the smart power source boxes 10a to 10d via two routes: the communication line Lc: and the power source line L2. The smart power source boxes 10a to 10d usually receive the detection signal via the communication line Lc. When the smart power source boxes 10a to 10d cannot receive the detection signal from the communication line Lc, they judge this state as a communication disruption state, and receive the detection signal via the power source line L2 which is demodulated by the demodulators 7a to 7d.

According to the embodiment described above, by using the power source line L2 as a backup of the communication line Lc, the backup can be provided without increasing the number of members, whereby the smart power source boxes 10a to 10d can receive the detection signal from the battery sensor 9 securely.

In the future, a mainstream of on-board batteries will be probably shifted from lead batteries to lithium batteries. A higher level of battery management is required for a lithium battery than a lead battery. Further, due to the promotion of automatic driving, it becomes necessary to secure the reliability of the communication. However, if adopting the communication system of the above-described embodiment, such reliability can be secured.

Moreover, according to the above-described embodiment, the smart power source boxes 10a to 10d control the respective loads 36a to 36d by self-control. Thereby, higher functionality can be realized than a case of adopting a configuration in which one control unit such as an ECU controls the plural loads 36a and 36d collectively.

In addition, the communication method adopts the PLC for the power source lines L1 to L3 separately from the LIN, CAN or the like for the communication line Lc, so that there is a merit of reducing the simultaneous multiple failures.

The above-described embodiments have shown just representative forms of the present invention, and the present invention is not limited to those embodiments. That is, the present invention can be carried out by being modified variously without departing from the scope of the invention.

REFERENCE SIGNS LIST 1 communication system
2 master control device (transmission unit)
4 slave control device (reception unit)
6 modulator (modulation unit)

7 demodulator (demodulation unit)
9 battery sensor (transmission unit)
10a to 10d smart power source box (reception unit)
11 switching unit (modulator)
31 load
32 load
35 traveling system load (load)
36a to 36d load
B battery
B1 battery
B2 battery (another battery)
CP2 comparator (comparing unit)
F2 high pass filter
L1 to L3 power source line
Lc communication line
Q1 FET (semiconductor transistor)
Q12 FET (semiconductor transistor, switching semiconductor transistor)

The invention claimed is:

1. A communication system comprising:
a master control device;
a reception device configured to receive a communication signal from the master control device;
a power source line connecting an electrode of a first battery and electrical loads;
a modulator configured to superimpose the communication signal from the master control device on the power source line;
a demodulator configured to demodulate the communication signal superimposed on the power source line and configured to supply the communication signal to the reception device, and
a switching semiconductor transistor provided between the first battery and a second battery and configured to switch on and off a connection between the first battery and the second battery,
wherein the modulator is provided on the power source line on a side closer to the first battery,
the demodulator is provided on the power source line on a side closer to the electrical loads,
the modulator is configured to superimpose the communication signal on the power source line on the side closer to the electrical loads with respect to the modulator, and
the modulator comprises the switching semiconductor transistor, the switching semiconductor transistor comprising a control terminal to which the communication signal from the master control device is input.

2. The communication system according to claim 1, wherein a pulse communication signal that gradually rises and gradually falls is input into the control terminal of the semiconductor transistor.

3. The communication system according to claim 1, wherein the demodulator comprises: a high pass filter that is configured to differentiate a voltage on the power source line on which the communication signal is superimposed; and a comparing unit that is configured to compare the differentiated voltage with a reference voltage and output a comparison result as a demodulated communication signal.

4. The communication system according to claim 1, further comprising a communication line for transmitting the communication signal from the master control device to the reception device,
wherein the reception device is provided so as to be configured to receive both the communication signal from the communication line and the communication signal from the power source line that is demodulated by the demodulator, and configured to receive the communication signal via the power source line when the reception device cannot receive the communication signal from the communication line.

5. The communication system according to claim 2, wherein the demodulator comprises: a high pass filter that is configured to differentiate a voltage on the power source line on which the communication signal is superimposed; and a comparing unit that is configured to compare the differentiated voltage with a reference voltage and output a comparison result as a demodulated communication signal.

6. The communication system according to claim 2, further comprising a communication line for transmitting the communication signal from the master control device to the reception device,
wherein the reception device is provided so as to be configured to receive both the communication signal from the communication line and the communication signal from the power source line that is demodulated by the demodulator, and configured to receive the communication signal via the power source line when the reception device cannot receive the communication signal from the communication line.

7. The communication system according to claim 3, further comprising a communication line for transmitting the communication signal from the master control device to the reception device,
wherein the reception device is provided so as to be configured to receive both the communication signal from the communication line and the communication signal from the power source line that is demodulated by the demodulator, and configured to receive the communication signal via the power source line when the reception device cannot receive the communication signal from the communication line.

8. The communication system according to claim 5, further comprising a communication line for transmitting the communication signal from the transmission unit to the reception device,
wherein the reception device is provided so as to be configured to receive both the communication signal from the communication line and the communication signal from the power source line that is demodulated by the demodulator, and configured to receive the signal via the power source line when the reception device cannot receive the communication signal from the communication line.

* * * * *